US005846499A

United States Patent [19]

Laughlin et al.

[11] Patent Number: 5,846,499

[45] Date of Patent: Dec. 8, 1998

[54] AIR INDUCTION BOWL FOR USE WITH A DETERGENT DISPENSER

[75] Inventors: Timothy E. Laughlin, Edina; Robert C. Grant, Eden Prairie, both of Minn.

[73] Assignee: Sunburst Chemicals, Inc., Bloomington, Minn.

[21] Appl. No.: 607,698

[22] Filed: Feb. 27, 1996

[51] Int. Cl.[6] .......... B01D 11/02

[52] U.S. Cl. .......... 422/264; 422/266

[58] Field of Search .......... 422/263, 264, 422/266

[56] References Cited

U.S. PATENT DOCUMENTS

| | | | |
|---|---|---|---|
| Re. 32,818 | 1/1989 | Fernholz et al. | 252/90 |
| 2,704,241 | 3/1955 | Gannon | 137/268 |
| 3,595,395 | 7/1971 | Lorenzen | 210/169 |
| 3,615,244 | 10/1971 | Long | 222/193 |
| 4,250,910 | 2/1981 | King | 137/268 |
| 4,357,953 | 11/1982 | Patterson | 137/88 |
| 4,426,362 | 1/1984 | Copeland et al. | 422/263 |
| 4,444,730 | 4/1984 | Renders et al. | 422/264 |
| 4,463,582 | 8/1984 | Saalmann et al. | 68/17 R |
| 4,687,121 | 8/1987 | Copeland | 222/64 |
| 4,690,305 | 9/1987 | Copeland | 222/52 |
| 4,826,661 | 5/1989 | Copeland et al. | 422/106 |
| 4,858,449 | 8/1989 | Lehn | 68/12 R |
| 4,964,185 | 10/1990 | Lehn | 8/158 |
| 4,995,418 | 2/1991 | Cervola | 137/268 |
| 4,999,124 | 3/1991 | Copeland | 252/90 |
| 5,137,694 | 8/1992 | Copeland et al. | 422/106 |
| 5,147,615 | 9/1992 | Bird et al. | 422/261 |
| 5,194,230 | 3/1993 | PeKarna et al. | 422/263 |
| 5,342,587 | 8/1994 | Laughlin et al. | 422/266 |
| 5,384,102 | 1/1995 | Ferguson et al. | 422/266 |
| 5,417,233 | 5/1995 | Thomas et al. | 134/93 |
| 5,427,748 | 6/1995 | Wiedrich et al. | 422/266 |

*Primary Examiner*—Ivars Cintins
*Attorney, Agent, or Firm*—Patterson & Keough, P.A.

[57] ABSTRACT

A chemical dispenser that uses an air induction bowl and the air induction bowl. The bowl is adapted to support an inverted container of solid cast chemical and has a jet for directing a spray of liquid on the solid cast chemical to generate a solution thereof. The chemical dispenser has a valve for control of the liquid supplied to the chemical dispenser, the valve being in flow communication with the jet. The bowl comprises a container receiver portion having an upwardly directed container opening defined therein for receiving an inverted container. The container receiver portion presents an inner surface for supporting the container in an inverted disposition. An accumulator portion of the bowl depends from and is in fluid communication with the container receiver portion. The jet is disposed in the accumulator portion of the bowl. A discharge portion depends from and is in fluid communication with the accumulator portion. The discharge portion has an air induction opening that is in fluid communication with the accumulator portion.

21 Claims, 3 Drawing Sheets

AIR INDUCTION BOWL FOR USE WITH A DETERGENT DISPENSER

TECHNICAL FIELD

The present invention relates to devices for dispensing a detergent solution. In particular, it relates to a bowl that is utilized with a detergent dispenser, the dispenser forming a detergent solution from a solid cast detergent.

BACKGROUND OF THE INVENTION

There is a need in industry today to provide a detergent solution that is ready to use when mixed and that is made from solid cast detergent. Solid cast detergent is essentially detergent that is in solid form and cast in a preferably pliable, plastic container; it is effectively a bar of soap in a plastic container. Removal is typically done by dissolving the detergent in place in the container with a jet of water.

There are a number of advantages to using solid cast detergent as compared to liquid detergent. The first is safety. Since the detergent is cast inside of a container it is virtually impossible for personnel to come in contact with the detergent until it has been diluted. The U.S. Department of Transportation recognizes such detergent as safe to ship. If there is an accident, there is no liquid spillage to contaminate the ground water in the immediate area. The containers, even if cracked by the accident, retain the detergent and may simply be retrieved.

The concentration that is possible with solid cast detergent provides additional advantages. Such detergent is typically 100% detergent material as opposed to liquid detergent which is between 40% and 5% detergent, with the remainder being water. A single capsule of solid detergent can do the same work as six to seven gallons of typical liquid detergent. A related advantage is the compactness of solid detergents that provides benefits when storing the detergent, shipping detergent, and when handling the detergent. The dramatic reduction in storage space is especially attractive to relatively small commercial establishments such as gas stations and fast food restaurants that have very little space to devote to storing cleaning supplies. Freight costs are also dramatically reduced since the cost of shipping water is eliminated. Other handling costs are also reduced since, for equal cleaning potential, substantially less weight and volume is being handled as compared to liquid detergent.

Another advantage of solid cast detergent is that it has an essentially indefinite shelf life. Very little can occur that can change the character of the product over time.

Solid cast detergents are more environmentally sound than liquid detergents. Studies have shown that "bag-in-a-box" and five gallon pail packaging of liquid detergent actually have approximately four to five ounces of detergent left when the package is considered empty and therefore is discarded. Raw detergent is accordingly dumped into landfills when liquid detergent packages are discarded. Solid cast detergents use approximately one sixth the volume of empty containers as a liquid system of equal cleaning capacity, and solid cast detergent containers are usually thoroughly rinsed of all detergent by water jet action before being discarded or recycled.

A further requirement of detergent dispensers is that the dispenser should preferably provide a ready to use solution. This requirement is a major concern for many commercial establishments. The portion of the labor pool that is utilized for cleaning functions is typically the lower skilled and less educated portion. Training of these employees is difficult and expensive. The fact that the solution is ready to use minimizes the training that is required for proper usage.

Another aspect of the training issue is that the dispenser should have a minimum number of controls and control operations necessary to obtain a bucket of properly mixed detergent solution. Ideally, the turning of a single valve would provide the solution.

Reliability is another desirable characteristic of a detergent dispenser. A minimum number of moving parts should be provided to minimize maintenance. The dispenser should also be small and be capable of being mounted on the wall, since the storage area for cleaning equipment in most commercial establishments is very small.

A further concern is that the chemical solution that is formed within the dispenser be isolated from the water supply, which in most cases is the water supply of the local municipality. There is considerable concern that in the event of a backup of the chemical solution in the dispenser, the chemical may be drawn into the water supply through the various plumbing that is in the dispenser. Accordingly, means must be devised to ensure that such contamination does not occur.

In the past, liquid detergent dispensers have been available that dispense a ready to use detergent solution. Additionally, solid cast detergent dispensers have been available. Drawing the concentrated chemical solution from the dispenser has proved to be a problem. When in the concentrated form, the chemical solution does not tend to flow freely and has a tendency to accumulate in the dispenser.

In view of the foregoing, it would be a decided advantage to have a detergent dispenser that utilizes a solid cast detergent and that can discharge a ready to use concentration of detergent solution. The design should minimize the backup of the detergent solution to potentially contaminate the water source. Additionally, it would be helpful if the chemical solution was forcefully expressed for use.

SUMMARY OF THE INVENTION

The solid cast detergent dispenser in accordance with the present invention meets the above needs. The detergent dispenser hereof is a reliable, easy to use mechanical device capable of being mounted on a wall in a very limited space that dispenses a ready to use detergent solution from a solid cast detergent.

The disclosed detergent dispenser is adapted for connection to a source of heated water, such as a conventional sink. The dispenser includes a dispenser bowl adapted to receive the solid cast detergent and includes a water jet disposed in the dispenser bowl to direct a spray of water onto the detergent block. The spray dissolves the detergent to produce a concentrated solution of detergent and water. A proportioning valve controls the incoming heated water.

The dispenser is connected to the water source. A valve is utilized to split the incoming water in a desired proportion between the water jet and a mixing conduit for diluting the concentrated solution of detergent and water. The mixing conduit has an air induction port formed therein.

The dispenser bowl has a circumferential air induction collar disposed proximate the discharge opening thereof. Both the air induction port and the air induction collar are disposed beneath the water jet and the valve, such that in the event of a backup of detergent solution, the solution will spill out of the air induction port and the air induction collar prior to rising to the level of the water jet or the valve, where the potential for water supply contamination exists.

The present invention comprises a chemical dispenser that uses an air induction bowl and the air induction bowl. The bowl is adapted to support an inverted container of solid cast chemical and has a jet for directing a spray of liquid on the solid cast chemical to generate a solution thereof. The chemical dispenser has a valve for control of the liquid supplied to the chemical dispenser, the valve being in flow communication with the jet. The bowl comprises a container receiver portion having an upwardly directed container opening defined therein for receiving an inverted container. The container receiver portion presents an inner surface for supporting the container in an inverted disposition. An accumulator portion of the bowl depends from and is in fluid communication with the container receiver portion. The jet is disposed in the accumulator portion of the bowl. A discharge portion depends from and is in fluid communication with the accumulator portion. The discharge portion has an air induction opening that is in fluid communication with the accumulator portion.

DETAILED DESCRIPTION OF THE DRAWINGS

Figure 1:
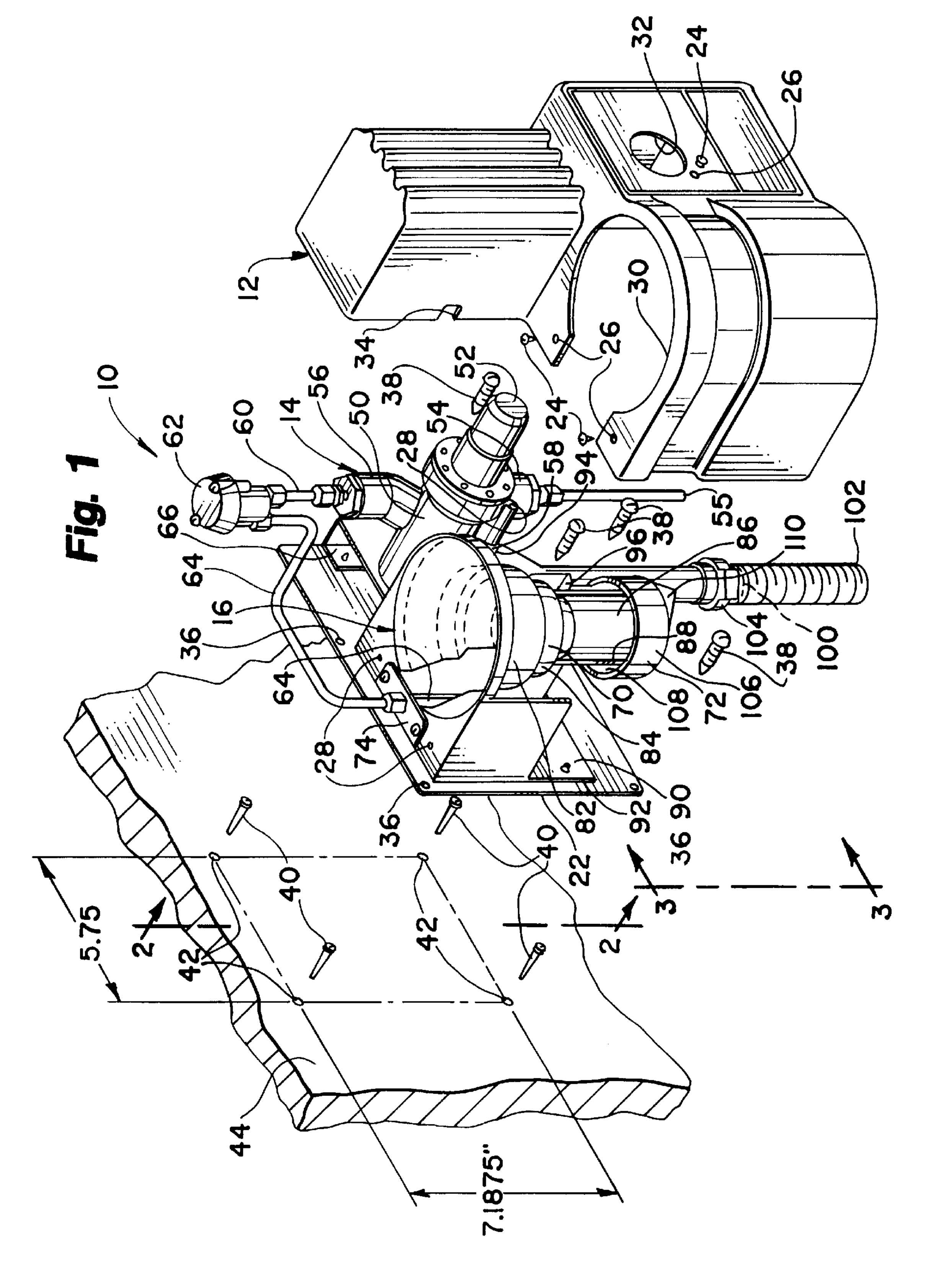
FIG. 1 is a partially exploded, perspective view of a detergent dispenser in accordance with the present invention.

Referring to the drawings, a chemical dispenser 10 in accordance with the present invention broadly includes enclosure 12, valve unit 14, and bowl unit 16.

The enclosure 12 is comprised of two components: cover 20 and backing plate 22. The cover 20 is preferably formed of relatively thin thermo plastic material formed in a single unit generally as depicted in FIG. 1.

The cover 20 is affixed to the dispenser 10 by screws 24 being passed through screw holes 26 and threaded into screw bores 28 formed in both the bowl unit 16 and the valve unit 14. The cover 20 includes a container opening 30 that is of sufficient size to receive a selected inverted container of dry cast chemical. The cover 20 additionally has a valve opening 32 defined therein. The valve opening 32 is designed to permit a portion of the valve unit 14 to project therethrough when the cover 20 is installed on the dispenser 10. A third opening defined in the cover 20 is conduit opening 34. The conduit opening 34 is designed to accommodate the passage of a water conduit therethrough.

The backing plate 22 is typically made of a metallic material such as aluminum or stainless steel. The backing plate 22 has a plurality of mounting holes 36 defined therein. Screws 38 pass through the mounting holes 36 and are threaded into anchors 40 that are compressionally anchored in bores 42 formed in wall 44. The wall 44 depicted is a portion of the wall of the facility in which the dispenser 10 is installed.

A second major component of the dispenser 10 is the valve unit 14. The valve unit 14 has a valve body 50, preferably formed of a thermo plastic material. A rotatable actuator 52 is coupled to a proportioning valve (not shown) contained within the valve body 50.

The valve body 50 has a water inlet 54, a water jet outlet 56, and a mixing outlet 58. The water inlet 54 is preferably fluidly coupled to a source of hot water under pressure by means of water inlet conduit 55. Such hot water is typically the hot water service in the facility in which the dispenser 10 is installed that is available from a tap or is plumbed directly into the facility plumbing.

The water jet outlet 56 is fluidly coupled by means of a conduit 60 to a vacuum breaker 62. In an alternate embodiment, the vacuum breaker 62 is omitted, and the conduit 60 is directly coupled to the jet inlet conduit 64.

The valve unit 14 is held in place on backing plate 22 by means of mount 66.

The third major component of the dispenser 10 is the bowl unit 16. The bowl unit 16 has two subcomponents: bowl body 70 and mixing conduit body 72.

Figure 2:
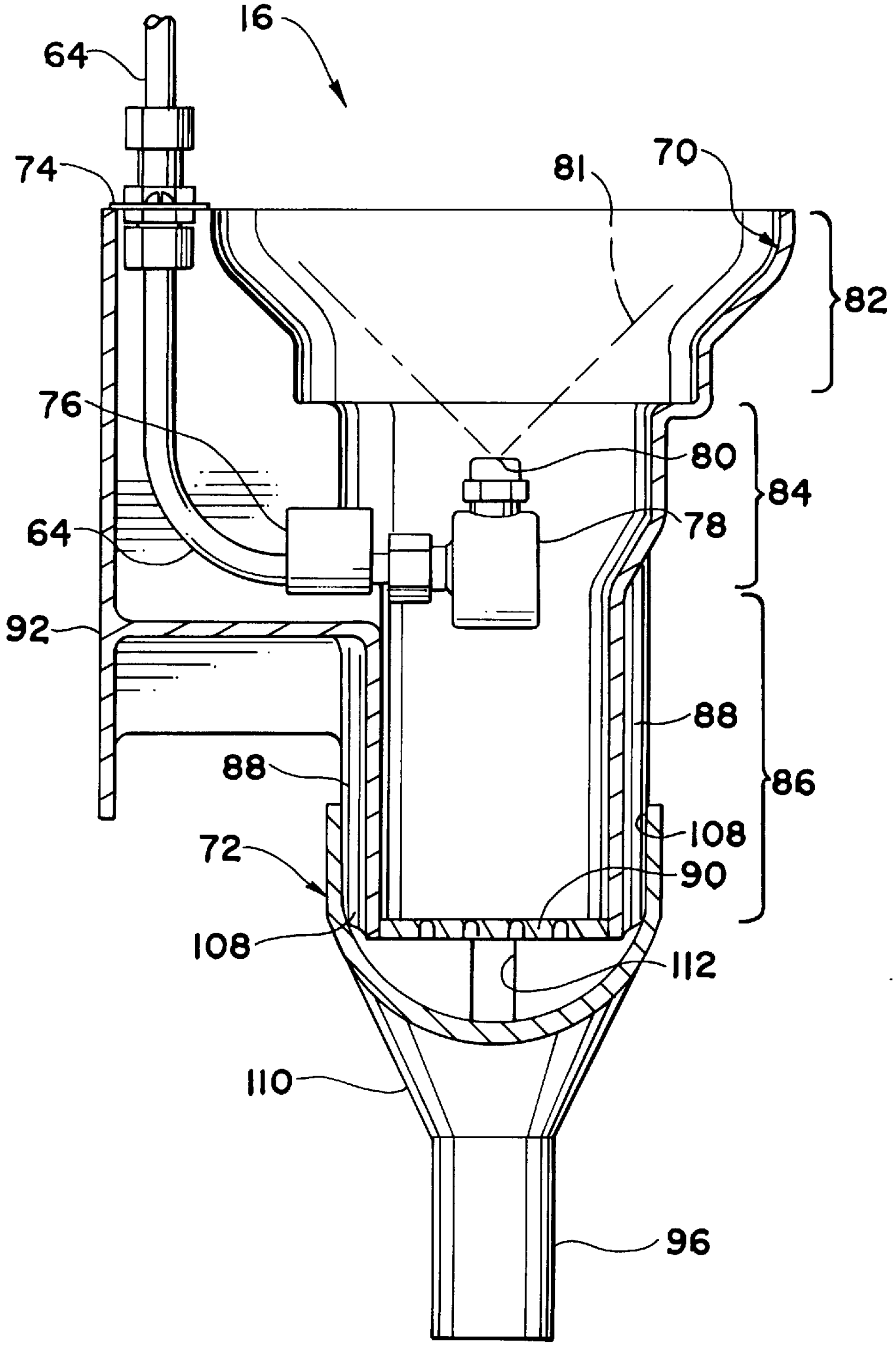
FIG. 2 is a sectional view of the detergent dispenser bowl taken along line 2—2 in FIG. 1.
Figure 3:
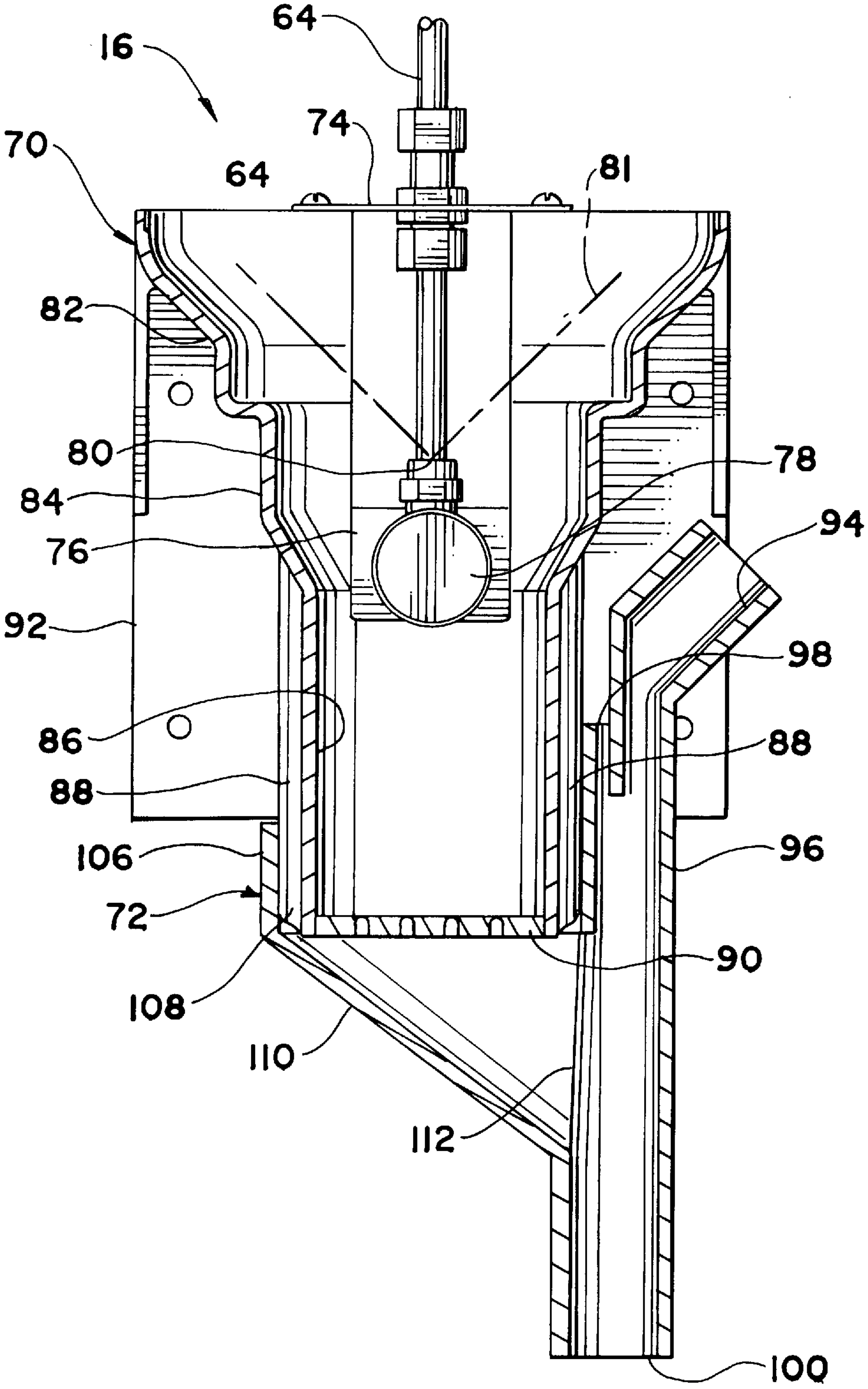
FIG. 3 is a sectional view of the detergent dispenser bowl taken along line 3—3 in FIG. 1.

The bowl body 70 is preferably formed as a single unit and constructed of a thermo plastic material. The bowl body 70 includes an inlet conduit bracket 74 mounted thereon. The inlet conduit bracket 74 assists in supporting the jet inlet conduit 64. The jet inlet conduit 64 descends from the inlet conduit bracket 74 and passes through a water jet support 76, as depicted in FIGS. 2 and 3. The jet inlet conduit 64 is then coupled to water jet 78. The water jet 78 is so disposed within the bowl body 70 as to present an upwardly directed nozzle 80. The upwardly directed spray is depicted at 51 in FIGS. 2 and 3.

The bowl body 70 has three distinct portions. From top to bottom as depicted in the figures, the portions of the bowl body 70 are chemical container receiver 82, solution accumulator 84, and cylindrical discharge 86.

The chemical container receiver 82 has a relatively large upwardly directed opening at the top and has inwardly sloping sides terminating in a ring of substantially constant circumference. The chemical container receiver 82 is designed to receive and support the inverted neck and shoulders of a chemical container having solid cast chemical compound contained therein.

The solution accumulator 84 has the water jet 78 disposed therein such that the upward directed nozzle 80 of the water jet 78 is positioned immediately beneath the mouth of the chemical container supported within the chemical receiver 82 and the spray 51 will bear upon the exposed dry cast chemical.

The cylindrical discharge 86 depends from the solution accumulator 84 and is preferably of reduced diameter as compared to solution accumulator 84. The sides of the cylindrical discharge 86 are strengthened by means of four webs 88 formed on the exterior surface thereof. A screen 90 is positioned in the discharge end 91 of the cylindrical discharge 86.

The bowl body 70 is held affixed to the backing plate 22 by screws threaded into mounting plate 92. The mounting plate 92 is formed integral with the bowl body 70.

The mixing conduit body 72 is formed of a rigid thermal plastic material and is preferably bonded to the bowl body 70.

The mixing conduit body 72 is the second subcomponent of the bowl unit 16. The mixing conduit body 72 has a mixing water inlet 94. The mixing water inlet 94 is fluidly coupled to the mixing outlet 58 of valve body 50.

The mixing water inlet 94 opens into a descending mixing water conduit 96. An air induction port 98 is defined in the mixing water conduit 96. When the mixing conduit body 72 is mated to the bowl body 70, the air induction port 98 is positioned substantially below the nozzle 80 of the water jet 78 disposed in the solution accumulator 84.

The mixing water conduit 96 depends from the point of intersection of the air induction port 98 and terminates at its distal end in a solution discharge port 100. In a preferred embodiment, the cross sectional area of the solution discharge port 100 is greater than the cross sectional area of the mixing water inlet 94.

The solution hose 102 is held by a hose clamp 104 to the mixing water conduit 96 proximate the solution discharge port 100. Preferably, the solution hose 102 terminates in a receptacle such as a pail or a spray bottle used by an operator.

A circumferential air induction collar 106 comprises a portion of the mixing conduit body 72. The circumferential air induction collar 106 encloses and is spaced apart from the discharge end of the cylindrical discharge 86. The air induction collar 106 is bonded to the webs 88 that support the cylindrical discharge 86. Accordingly, the collar port 108 is formed around the exterior surface of the cylindrical discharge 86 and has a width dimension that is generally equal to the width of the webs 88. The collar port is disposed elevated with respect to the discharge end 91 of the cylindrical discharge 86.

The air induction collar 106 has a funnel 110 depending therefrom. Funnel 110 opens into a solution interconnect slot 112 formed in the wall of the mixing water conduit 96. The solution interconnect slot 112 fluidly connects the interior portion of the bowl body 70 with the mixing water conduit 96.

In operation, heated water under pressure is typically at all times available to the valve unit 14 through the inlet conduit 55. Rotation of the actuator 52 to a first position configures the valve to supply water to the water jet 78 only. Accordingly, heated water under pressure passes through the water jet outlet 56, the vacuum breaker 62, when so installed, and jet inlet conduit 64 to the water jet 78. An upwardly directed spray 81 of heated water is emitted from the nozzle 80 and impinges on the exposed solid cast chemical contained within the inverted chemical container that is received within the chemical receiver 82 within bowl body 70. The spray of heated water erodes the solid cast chemical. A concentrated solution of the solid cast chemical flows down the inner walls of a chemical container onto the inner walls of the solution accumulator 84. The concentrated solution flows through the cylindrical discharge 86 under the force of gravity and passes through the funnel 110 of the mixing conduit body 72 to the mixing water conduit 96 and flows downward through the solution hose 102.

Further rotation of the actuator 52 proportionally splits the incoming heated water in a desired ratio between the water jet 78 and the mixing water conduit 96. The proportion of the incoming heated water provided to the water jet 78 generates a concentrated chemical solution as previously described. A portion of heated water passes out of the valve body 50 through the mixing outlet 58 and thence to the mixing water conduit 96 of the mixing conduit body 72. The water flows downward through the mixing water conduit 96 and is mixed in the mixing water conduit 96 with the concentrated solution flowing from funnel 110 through the solution interconnect slot 112. This mixing creates a diluted chemical solution that is discharged through the solution hose 102.

The mixing water conduit 96 acts a venturi to assist in drawing the chemical solution from the cylindrical discharge 86 through the funnel 110. The venturi action is a function of the fact that the mixing water inlet 94 has a lesser area than the solution discharge port 100 of the mixing water conduit 96. An area of reduced pressure with respect to atmospheric pressure is formed in the mixing water conduit 96. the reduced pressure is felt at the regions with which the mixing water conduit 96 is fluidly connected. Accordingly, the venturi effect acts to draw air in through the air induction port 98 and through the collar port 108 formed by the circumferential air induction collar 106, and acts to draw the concentrated chemical solution from the cylindrical discharge 86 of the bowl body 70.

The venturi action acts to aerate the chemical solution discharged from the solution hose 102 and generates a negative pressure in the solution cumulator 84 and cylindrical discharge 86 of the bowl body 70 and in the mixing water conduit 96 of the mixing conduit body 72. Such negative pressure assists in ensuring that the no backup of chemical solution is possible either within the bowl body 70 or the mixing conduit body 72. Additionally, should a backup of chemical solution occur, such backup in the bowl body 70 would flow out of the collar port 108 before reaching the water jet 78 where the chemical solution could contaminate the water supply.

Additionally, to further guard against a chemical solution backup in the mixing water conduit 96, backed up chemical solution flows out of the air induction port 98, thereby isolating the chemical solution from the valve in the valve body 50, where the chemical solution could additionally contaminate the water supply.

Accordingly, the dispenser 10 of the present invention acts to draw the chemical solution from the dispenser 10 by means of venturi action, acts to aerate the chemical solution by inducting air through the collar port 108 and the air induction port 98, and incorporates chemical solution backup protection by means of providing chemical solution overflows through the collar port 108 and the air induction port 98.

It will be recognized that the foregoing embodiments are merely exemplary of the invention, and that modifications and extensions will be obvious which do not depart from the scope of the invention as defined by the following claims.

We claim:

1. A bowl for use in a chemical dispenser, the bowl being adapted to support an inverted container of solid cast chemical and having a jet for directing a spray of liquid from a liquid source on the solid cast chemical to generate a chemical solution thereof, the chemical dispenser having a valve for control of the liquid supplied to the chemical dispenser, the valve being in flow communication with the jet, comprising:

a container receiver portion having an upwardly directed container opening defined therein for receiving an inverted container and presenting an inner surface for supporting the container in an inverted disposition;

an accumulator portion depending from and in fluid communication with the container receiver portion, the jet being disposed therein; and a discharge portion depending from and in fluid communication with the accumulator portion, the discharge portion defining a fluid discharge passageway for discharging chemical solution and having an air induction opening, the air induction opening being in fluid communication with the fluid discharge passageway and being spaced apart from the jet, the air induction opening acting to isolate the jet from chemical solution that may backup from the fluid discharge passageway, thereby preventing the contamination of the liquid source with chemical solution flowing through the jet.

2. A bowl as claimed in claim 1, wherein the discharge portion has a discharge opening adapted to discharge a flow of fluid, the air induction opening being disposed between the accumulator portion and the discharge opening.

3. A bowl as claimed in claim 2 wherein the air induction opening is formed as a collar around the discharge portion and spaced apart therefrom.

4. A bowl as claimed in claim 1, further including a mixing conduit, the mixing conduit being in flow communication with the valve and having an interconnect slot defined therein, said interconnect slot establishing flow communication between the mixing conduit and the discharge portion of the bowl, and having an air inducting port disposed in said mixing conduit between said interconnect slot and said valve.

5. A bowl as claimed in claim 4, wherein fluid flow in the mixing conduit generates an area of negative pressure therein, the negative pressure acting to draw fluid into the mixing conduit through the air induction port, the air induction opening and the fluid discharge passageway of the discharge portion of the bowl.

6. A bowl as claimed in claim 5, wherein the mixing conduit has a fluid inlet at a first end, the fluid inlet being fluidly coupled to the valve and a fluid outlet at a second end thereof, the fluid inlet having a lesser cross sectional area than the cross sectional area of the fluid outlet.

7. A chemical dispenser having a bowl being adapted to support an inverted container of solid cast chemical and having a jet disposed within the bowl for directing a spray of liquid from a liquid source on the solid cast chemical to generate a chemical solution thereof, the chemical dispenser having a valve for control of the liquid supplied to the chemical dispenser, the valve being in flow communication with the jet, the bowl comprising:

a container receiver portion having an upwardly directed container opening defined therein for receiving an inverted container and presenting an inner surface for supporting the container in an inverted disposition;

an accumulator portion depending from and in fluid communication with the container receiver portion, the jet being disposed therein; and a discharge portion depending from and in fluid communication with the accumulator portion, the discharge portion defining a fluid discharge passageway for discharging chemical solution and having an air induction opening, the air induction opening being in fluid communication with the fluid discharge passageway and being spaced apart from the jet, the air induction opening acting to isolate the jet from chemical solution that may backup from the fluid discharge passageway, thereby preventing the contamination of the liquid source with chemical solution flowing through the jet.

8. A chemical dispenser as claimed in claim 7, wherein the discharge portion has a discharge opening adapted to discharge a flow of chemical solution, the air induction opening being disposed between the accumulator portion and the discharge opening.

9. A chemical dispenser as claimed in claim 8 wherein the air induction opening is formed as a collar around the discharge portion and spaced apart therefrom.

10. A chemical dispenser as claimed in claim 7, further including a mixing conduit, the mixing conduit being in flow communication with the valve and having an interconnect slot defined therein, said interconnect slot establishing flow communication between the mixing conduit and the discharge portion, and having an air inducting port disposed in said mixing port between said interconnect slot and said valve.

11. A chemical dispenser as claimed in claim 10, wherein fluid flow in the mixing conduit generates an area of negative pressure therein, the negative pressure acting to draw fluid into the mixing conduit through the air induction port, the air induction opening, and the fluid discharge passageway of the discharge portion of the bowl.

12. A chemical dispenser as claimed in claim 11, wherein the mixing conduit has a fluid inlet at a first end, the fluid inlet being fluidly coupled to the valve, and a fluid outlet at a second end thereof, the fluid inlet having a lesser cross sectional area than the cross sectional area of the fluid outlet.

13. A chemical dispenser for dispensing a chemical solution having a valve being in flow communication with a source of fluid, a jet being in flow communication with the valve, a bowl for supporting a container of solid cast chemical, the jet being disposed within the bowl to cause a spray of liquid to impinge upon the solid cast chemical to form a chemical solution, and a solution discharge port being in flow communication with the bowl, comprising:

overflow means operably fluidly coupled to the bowl and the valve for providing a path of discharge of backed up chemical solution from the solution discharge port, whereby the discharge of the backed up chemical solution through the overflow means is substantially isolated from the jet disposed within the bowl and from the valve that is in flow communication with a source of fluid from interaction with the backed up chemical solution such that backed up chemical solution does not contaminate the source of fluid either through the jet or through the valve.

14. A chemical dispenser as claimed in claim 13 further including:

mixing apparatus being operably fluidly coupled to the valve for conveying a flow of fluid therefrom, the mixing apparatus being in flow communication with the bowl, whereby the flow of fluid in the mixing apparatus acts to cause an area of reduced pressure to form therein, the reduced pressure acting to draw the chemical solution from the bowl.

15. A chemical dispenser as claimed in claim 14 wherein the mixing apparatus is fluidly coupled to the overflow means and the reduced pressure formed in the mixing apparatus acts to draw fluid into the mixing apparatus through the overflow means.

16. A bowl for use in a chemical dispenser, the bowl being adapted to support an inverted container of solid cast chemical and having a jet for directing a spray of liquid on the solid cast chemical to generate a solution thereof, the chemical dispenser having a valve for control of the liquid supplied to the chemical dispenser, the valve being in flow communication with the jet, comprising:

a container receiver portion having an upwardly directed container opening defined therein for receiving an inverted container and presenting an inner surface for supporting the container in an inverted disposition;

an accumulator portion depending from and in fluid communication with the container receiver portion, the jet being disposed therein;

a discharge portion depending from and in fluid communication with the accumulator portion, the discharge portion defining a fluid discharge passageway and having an air induction opening, the air induction opening being in fluid communication with the fluid discharge passageway; and a mixing conduit, the mixing conduit being in flow communication with the valve and having an interconnect slot defined therein, said interconnect slot establishing flow communication between the mixing conduit and the discharge portion of the bowl, and having an air inducting port disposed in said mixing conduit between said interconnect slot and said valve.

17. A bowl as claimed in claim 16, wherein fluid flow in the mixing conduit generates an area of negative pressure therein, the negative pressure acting to draw fluid into the mixing conduit through the air induction port, the air induction opening and the fluid discharge passageway of the discharge portion of the bowl.

18. A bowl as claimed in claim 17, wherein the mixing conduit has a fluid inlet at a first end, the fluid inlet being fluidly coupled to the valve and a fluid outlet at a second end thereof, the fluid inlet having a lesser cross sectional area than the cross sectional area of the fluid outlet.

19. A chemical dispenser having a bowl being adapted to support an inverted container of solid cast chemical and having a jet disposed within the bowl for directing a spray of liquid on the solid cast chemical to generate a solution thereof, the chemical dispenser having a valve for control of the liquid supplied to the chemical dispenser, the valve being in flow communication with the jet, the bowl comprising:

a container receiver portion having an upwardly directed container opening defined therein for receiving an inverted container and presenting an inner surface for supporting the container in an inverted disposition;

an accumulator portion depending from and in fluid communication with the container receiver portion, the jet being disposed therein;

a discharge portion depending from and in fluid communication with the accumulator portion, the discharge portion defining a fluid discharge passageway and having an air induction opening, the air induction opening being in fluid communication with the fluid discharge passageway; and a mixing conduit, the mixing conduit being in flow communication with the valve and having an interconnect slot defined therein, said interconnect slot establishing flow communication between the mixing conduit and the discharge portion, and having an air inducting port disposed in said mixing port between said interconnect slot and said valve.

20. A chemical dispenser as claimed in claim 19, wherein fluid flow in the mixing conduit generates an area of negative pressure therein, the negative pressure acting to draw fluid into the mixing conduit through the air induction port, the air induction opening, and the fluid discharge passageway of the discharge portion of the bowl.

21. A chemical dispenser as claimed in claim 20, wherein the mixing conduit has a fluid inlet at a first end, the fluid inlet being fluidly coupled to the valve, and a fluid outlet at a second end thereof, the fluid inlet having a lesser cross sectional area than the cross sectional area of the fluid outlet.

* * * * *

UNITED STATES PATENT AND TRADEMARK OFFICE

CERTIFICATE OF CORRECTION

PATENT NO. : 5,846,499
DATED : December 8, 1998
INVENTOR(S) : Laughlin et al.

It is certified that error appears in the above-identified patent and that said Letters Patent is hereby corrected as shown below:

Column 1, line 37, before "detergent," insert --the--.

Column 3, line 2, delete "and the air induction bowl".

Column 5, line 60, after "acts" insert --as--.

Column 5, line 67, the first occurrence of "the" should be capitalized.

Signed and Sealed this

Twenty-seventh Day of July, 1999

Attest:

Q. TODD DICKINSON

*Attesting Officer* *Acting Commissioner of Patents and Trademarks*